United States Patent
Lu et al.

(10) Patent No.: US 11,978,947 B2
(45) Date of Patent: May 7, 2024

(54) RUGGED PORTABLE DEVICE

(71) Applicant: Winmate Inc., New Taipei (TW)

(72) Inventors: Ku-Ching Lu, New Taipei (TW);
Wei-Wen Yang, New Taipei (TW);
Hsin-Chin Wang, New Taipei (TW);
Chun-Yu Huang, New Taipei (TW)

(73) Assignee: Winmate Inc., New Taipei (TW)

( * ) Notice: Subject to any disclaimer, the term of this patent is extended or adjusted under 35 U.S.C. 154(b) by 284 days.

(21) Appl. No.: 17/456,772

(22) Filed: Nov. 29, 2021

(65) Prior Publication Data

US 2023/0103745 A1    Apr. 6, 2023

(51) Int. Cl.
*H01Q 1/22* (2006.01)
*G06F 1/16* (2006.01)

(52) U.S. Cl.
CPC ......... *H01Q 1/2266* (2013.01); *G06F 1/1628* (2013.01); *G06F 1/1698* (2013.01); *G06F 1/1662* (2013.01); *G06F 1/1686* (2013.01)

(58) Field of Classification Search
CPC ...... G06F 1/162; G06F 1/1628; G06F 1/1662; G06F 1/1677; G06F 1/1686; G06F 1/1698; G06F 1/3206; G06F 1/3215; G06F 1/325; G06F 1/3287; H01Q 1/2266; H01Q 21/28; H04B 5/0031; H04B 5/0043; H04B 5/0056; H04B 7/0602; H04B 7/0834
See application file for complete search history.

(56) References Cited

U.S. PATENT DOCUMENTS

| | | | |
|---|---|---|---|
| 11,379,538 B1 * | 7/2022 | McClusky | G06F 16/93 |
| 11,392,651 B1 * | 7/2022 | McClusky | G06F 40/295 |
| 11,522,290 B1 * | 12/2022 | Ma | H01Q 1/2283 |
| 2015/0241925 A1 * | 8/2015 | Seo | G06F 1/1652 361/679.27 |
| 2016/0006293 A1 * | 1/2016 | Jeong | G06F 1/1626 320/108 |
| 2017/0215293 A1 * | 7/2017 | Merenda | B60R 11/02 |
| 2020/0347206 A1 * | 11/2020 | Hayes | C08K 3/04 |
| 2021/0111481 A1 * | 4/2021 | Thakur | H01Q 1/245 |
| 2022/0416405 A1 * | 12/2022 | Harper | H04W 4/80 |
| 2023/0185338 A1 * | 6/2023 | Seo | G06F 1/1652 361/679.28 |

* cited by examiner

*Primary Examiner* — Thien M Le
(74) *Attorney, Agent, or Firm* — Christopher R. Christenson; Kelly, Holt & Christenson, P.L.L.C.

(57) ABSTRACT

A Rugged portable device comprises: a base, a cover pivotally connected to the base, a first antenna unit, a second antenna unit, and a control unit. The first antenna unit and the second antenna unit are respectively disposed at an edge of the cover and an edge of the base, and the first antenna unit and the second antenna unit respectively have a near-field antenna and a far-field antenna. When the cover pivots relative to the base and is close to the base, the near-field antenna disposed at the cover and the near-field antenna disposed at the base generate a near-field communication (NFC) sensing signal and the near-field communication sensing signal is transmitted to the control unit. Therefore, the control unit sets up one of functions in the rugged portable device. For instance, the control unit switches off and/or switches on the far-field antenna or a peripheral unit (a keyboard or a camera).

12 Claims, 11 Drawing Sheets

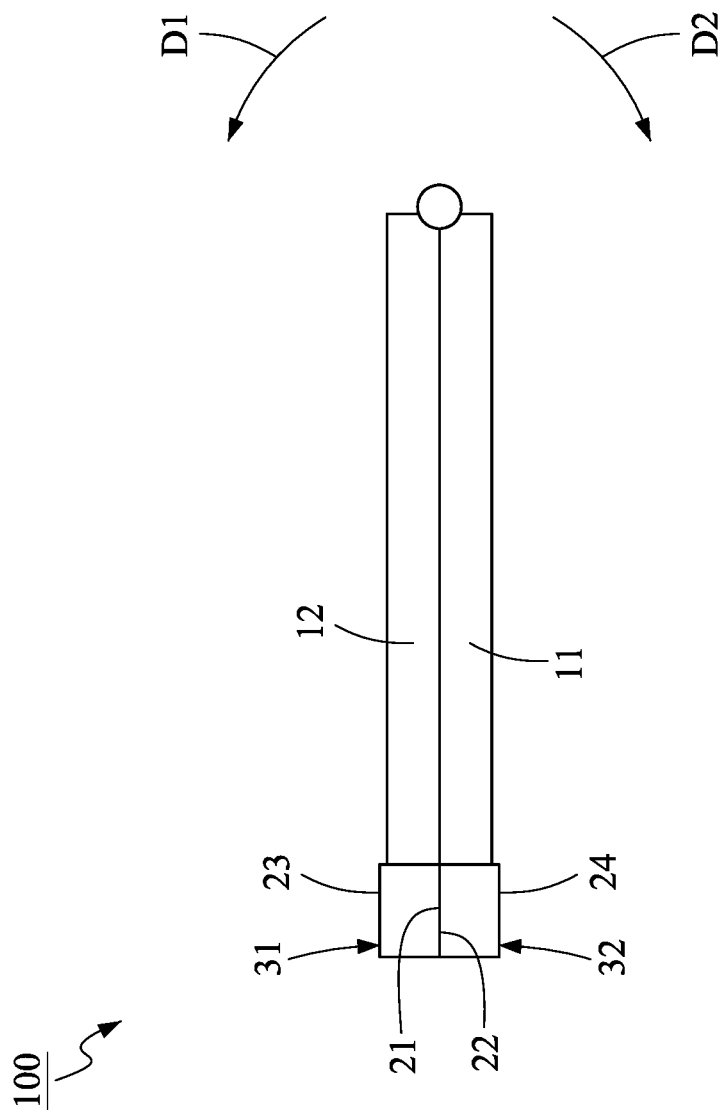

| Usage mode | Position of the cover with respect to the base | Description | Functions to be enabled or disabled |
|---|---|---|---|
| Folded mode | 0 to 30 degrees | The rugged portable device is in the folded mode; the first near-field communication sensing signal is generated. | (1) disable: the first far-field antenna of the first antenna unit, the second far-field antenna of the second antenna unit, the third far-field antenna of the third antenna unit, and the fourth far-field antenna of the fourth antenna unit.<br>(2) disable: all the peripheral units. |
| Working mode | 100 to 120 degrees | A user can input data by the keyboard while watching the screen; it is a normal working mode. | (1) enable: all the far-field antennas.<br>(2) enable: all the peripheral units, e.g., the keyboard, the touchpad, the front camera of the cover, the rear camera. |
| Demonstrating (stand-up) mode | (A) 330 to 360 degrees<br>(B) 0 to 30 degrees | A user may watch a video or demonstrate the screen for audience; the second near-field communication sensing signal is generated. | (1) disable: the keyboard, the touch pad, the rear camera, the peripheral input and output interface (port), and the third far-field antenna of the third antenna unit, the fourth far-field antenna of the fourth antenna unit<br>(2) enable: the first far-field antenna of the first antenna unit, the second far-field antenna of the second antenna unit. |
| Flat mode | Close to 180 degrees | A user may use both the touchpad and the keyboard. | (1) disable: the rear camera.<br>(2) enable: the front camera, the peripheral input and output interface (port). |

FIG.5

RUGGED PORTABLE DEVICE

FIELD OF THE INVENTION

The present invention relates to a portable device, and more particularly relates to a rugged portable device whose function is configurable by applying a technique of Near Field Communication (NFC).

BACKGROUND OF THE INVENTION

A portable device (e.g., a notebook computer, a tablet computer) generally includes an outer case, a LCD screen, a processor, and a cooling system. In addition, the portable device is equipped with an antenna unit to serve as a communication interface for receiving and transmitting information.

An antenna unit of a conventional portable device is covered by the outer case, which causes a shielding phenomenon on signal transmission and reception, resulting in unsatisfactory performance in information reception and transmission, where the outer case is generally made of metal. Moreover, in the conventional portable device, its functional units, e.g., an antenna, a camera, a keyboard, or a touchpad, could not be turned on or turned off according to the physical operation such as adjusting a relative pivot angle between a screen and a base. Therefore the functional units of the conventional portable device could not be operated in a power saving mode.

SUMMARY OF THE INVENTION

Therefore, one objective of the present invention is to provide a rugged portable device whose function is configurable by providing good antenna reception and transmission functions and saving the power consumption as well.

In order to achieve the above objective, the present invention provides a rugged portable device, comprising: a base; a cover pivotally connected to the base; a first antenna unit disposed at the cover and having a first near-field antenna; a second antenna unit disposed at the base and having a second near-field antenna; a first protecting element disposed on at least one side surface of the cover such that the first antenna unit is located between the cover and the first protecting element; a second protecting element disposed on at least one side surface of the base such that the second antenna unit is located between the base and the second protecting element; a control unit coupled to the first antenna unit and the second antenna unit; wherein when the cover is pivoted with respect to the base and gets close to the base, the first near-field antenna of the first antenna unit and the second near-field antenna of the second antenna unit generate a near-field communication sensing signal, the near-field communication sensing signal is transmitted to the control unit, and thereby enabling the control unit to perform a functional operation of the rugged portable device.

Preferably, the functional operation of the rugged portable device performed by the control unit includes enabling or disabling a peripheral unit which includes but not limited to: a keyboard, a front camera, a rear camera, a touchpad, a screen interface (HDMI), a network port (Lan Port), a USB port, an audio interface (Headphone Port), a power outlet, etc.

Preferably, the first near-field antenna of the first antenna unit is coupled to a first far-field antenna and a first switch, and the first near-field antenna, the first far-field antenna and the first switch are integrated on a first flexible printed circuit; the second near-field antenna of the second antenna unit is coupled to a second far-field antenna and a second switch, and the second near-field antenna, the second far-field antenna and the second switch are integrated on a second flexible printed circuit; the functional operation of the rugged portable device performed by the control unit includes: using the first switch of the first antenna unit to turn off or turn on the first far-field antenna of the first antenna unit; and using the second switch of the second antenna unit to turn off or turn on the second far-field antenna of the second antenna unit.

Preferably, the rugged portable device further includes: a third antenna unit and a fourth antenna unit respectively disposed on a periphery of the cover and a periphery of the base. A first near-field communication sensing signal is generated by the first near-field antenna of the first antenna unit and the second near-field antenna of the second antenna unit or by the first near-field antenna of the first antenna unit and the fourth near-field antenna of the fourth antenna unit. A second near-field communication sensing signal is generated by the third near-field antenna of the third antenna unit and the second near-field antenna of the second antenna unit or by the third near-field antenna of the third antenna unit and the fourth near-field antenna of the fourth antenna unit. The control unit performs a functional operation to a function of the rugged portable device according to the first near-field communication sensing signal or the second near-field communication sensing signal.

The rugged portable device of the present invention has the technical effects as follows. The rugged portable device can maintain good antenna reception and transmission functions under all physical operation. Moreover, in different physical operation of the rugged portable device of the present invention, the peripheral unit thereof could be configured to be enabled or disabled such that the power consumption is saved.

BRIEF DESCRIPTION OF THE DRAWINGS

FIG. 4A is a schematic side view illustrating a folded mode of a rugged portable device according to an embodiment of the present invention;

FIG. 5 is a table showing various usage modes of a rugged portable device according to an embodiment of the present invention.

DETAILED DESCRIPTION OF THE PREFERRED EMBODIMENTS

Figure 1:
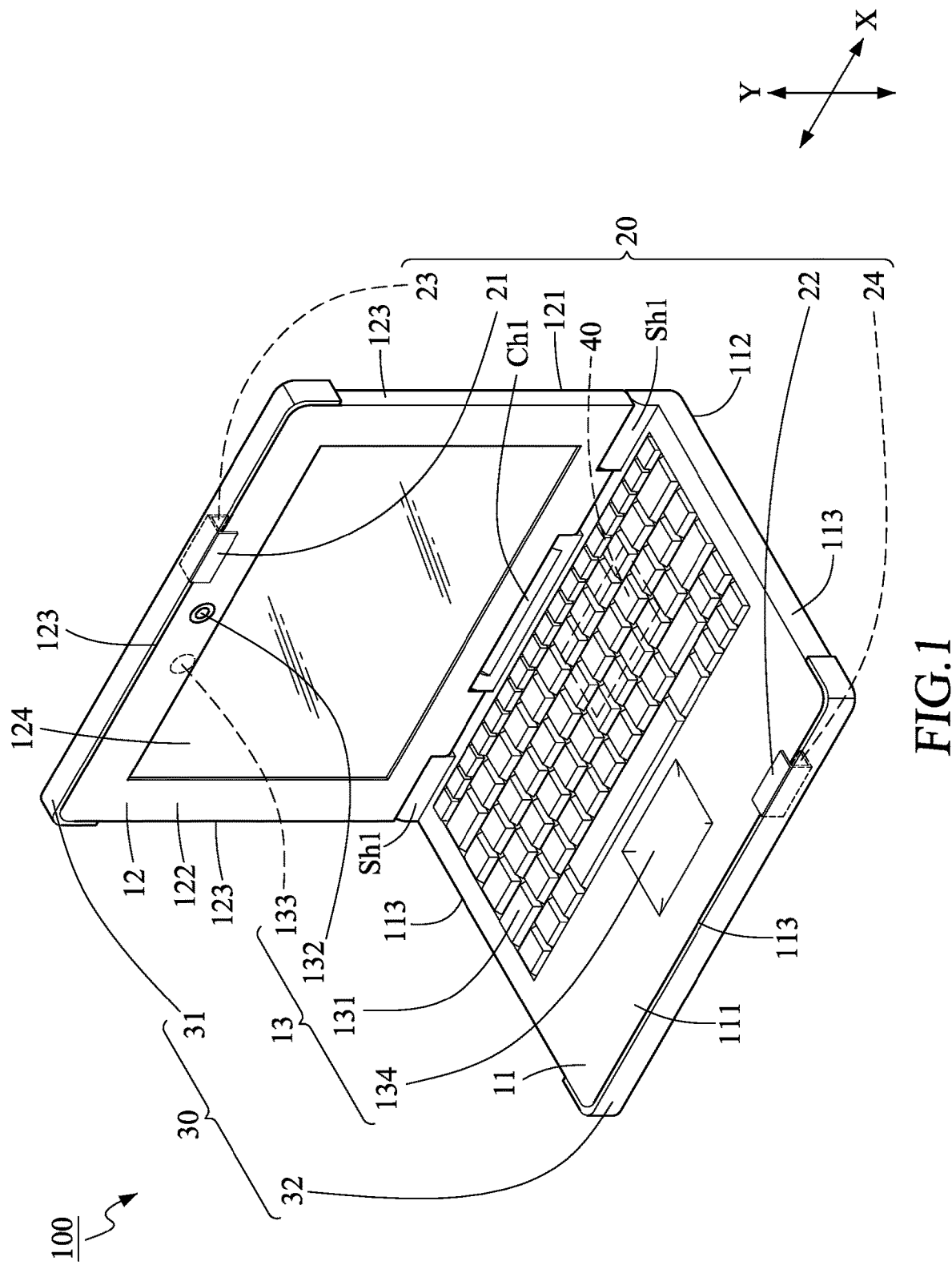
FIG. 1 is a schematic drawing illustrating a rugged portable device according to an embodiment of the present invention.

The preferred embodiments of the present invention are described in detail with reference to FIGS. 1 to 5. The description is used for explaining the embodiments of the present invention only, but not for limiting the scope of the claims.

As shown in FIGS. 1 to 3B, a rugged portable device 100 according to an embodiment of the present invention includes: a base 11, a cover 12, an antenna unit 20, a protecting element 30 and a control unit 40.

Figure 2:
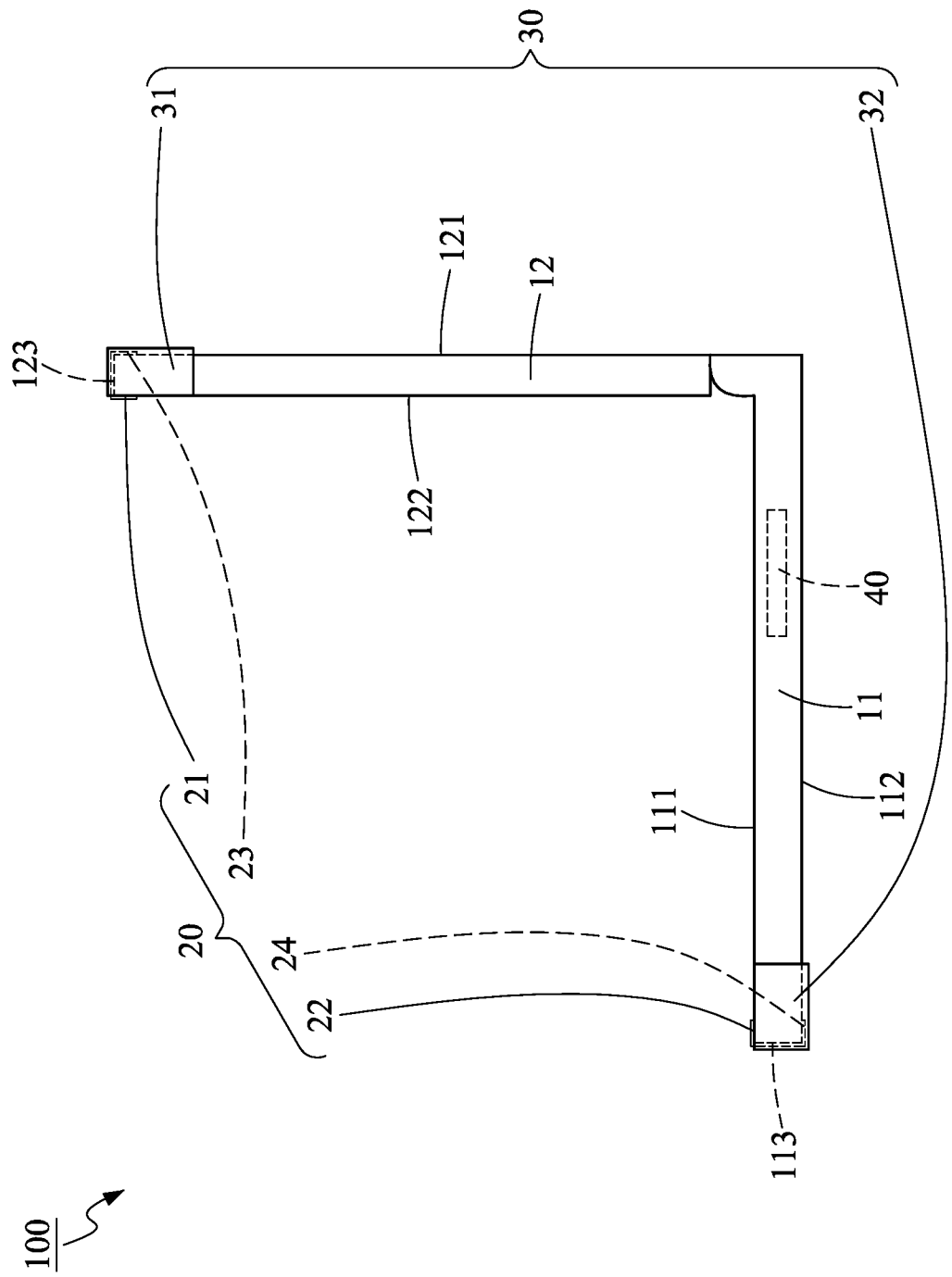
FIG. 2 is a schematic side view illustrating a rugged portable device according to an embodiment of the present invention.

As shown in FIGS. 1 to 3, the base 11 of the rugged portable device 100 is pivotally connected to the cover 12. Specifically, the cover 12 has an upper cover surface 121 and a lower cover surface 122. The upper cover surface 121 is often used to hold a company logo or to provide a rear camera 133, while the lower cover surface 122 is provided with a display screen 124 or a front camera 132. The base 11 includes an upper surface 111 and a lower surface 112 on which an operation input unit (e.g., a keyboard 131 or a touchpad 134) and a battery (not shown) are provided respectively. In this embodiment, the cover 12 is pivotable from 0 to 360 degrees relative to the base 11 via a hinge. The person skilled in the hinge field can easily implement a hinge on the rugged portable device 100 to pivot the cover 12 with respect to the base 11 from 0 to 360 degrees. The hinge is not included in the discussion of the present invention. The invention also does not be limited to the angle of the hinge pivoted.

As shown in FIG. 1, the rugged portable device 100 according to an embodiment of the present invention has a peripheral unit 13, which includes but not limited to, a keyboard 131, a front camera 132, a rear camera 133, and a touchpad 134. In other embodiments of the present invention, the peripheral unit 13 may also generally be referred to a port that is frequently used by a user, including, but not limited to, a screen interface (e.g., an HDMI port), a network port (e.g., a LAN port), a USB port, an audio interface (e.g., a headphone port), a power outlet, etc.

As shown in FIGS. 1 to 3A, the antenna unit 20 includes a first antenna unit 21, a second antenna unit 22, a third antenna unit 23, and a fourth antenna unit 24. Furthermore, the first antenna unit 21 has a first near-field antenna 211 and a first far-field antenna 212; the second antenna unit 22 has a second near-field antenna 221 and a second far-field antenna 222; the third antenna unit 23 has a third near-field antenna 231 and a third far-field antenna 232; and the fourth antenna unit 24 has a fourth near-field antenna 241 and a fourth far-field antenna 242. Specifically, the first antenna unit 21 is disposed at a periphery of the lower cover surface 122 of the cover 12; the second antenna unit 22 is disposed at a periphery of the upper surface 111 of the base 11; the third antenna unit 23 is disposed at a periphery of the upper cover surface 121 of the cover 12; and the fourth antenna unit 24 is disposed at a periphery of the lower surface 112 of the base 11.

The first near-field antenna 211, the second near-field antenna 221, the third near-field antenna 231, the fourth near-field antenna 241 are antennas with the technique of near field communication (NFC), and the first far-field antenna 212, the second far-field antenna 222, the third far-field antenna 232, and the fourth far-field antenna 242 include but not limited to: (1) antennas used to transmit and receive Wi-Fi signals, (2) antennas used to transmit and receive GPS signals, and (3) antennas used to transmit and receive LTE (3G/4G/5G) signals.

Figure 3A:
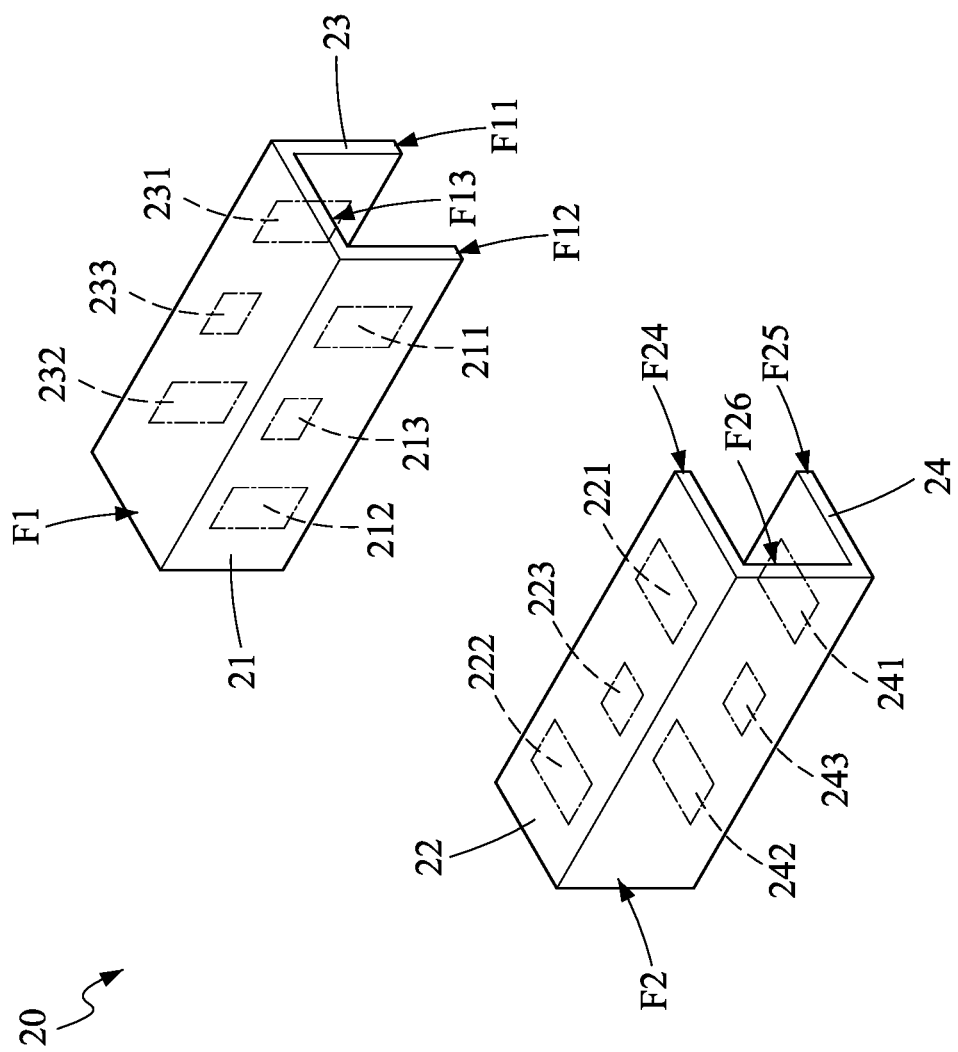
FIG. 3A is a schematic perspective view illustrating an antenna unit of a rugged portable device according to an embodiment of the present invention.

Specifically, as shown in FIG. 3A, in the rugged portable device 100 according to an embodiment of the present invention, in the first antenna unit 21, the first near-field antenna 211 and the first far-field antenna 212 are integrated with a first switch 213, and the first switch 213 determines to enable or disable the first near-field antenna 211 and the first far-field antenna 212. In the second antenna unit 22, the second near-field antenna 221 and the second far-field antenna 222 are integrated with the second switch 223, and the second switch 223 determines to enable or disable the second near-field antenna 221 and the second far-field antenna 222. In the third antenna unit 23, the third near-field antenna 231 and the third far-field antenna 232 are integrated with a third switch 233, and the third switch 233 determines to enable or disable the third near-field antenna 231 and the third far-field antenna 232. In the fourth antenna unit 24, the fourth near-field antenna 241 and the fourth far-field antenna 242 are integrated with a fourth switch 243, and the fourth switch 243 determines to enable or disable the near-field antenna 241 and the far-field antenna 242.

In a specific embodiment, each of the first switch 213, the second switch 223, the third switch 233, and the fourth switch 243 is a PIN diode. The control unit 40 uses the first switch 213, the second switch 223, the third switch 233, and the fourth switch 243 to enable or disable the first near-field antenna 211, the second near-field antenna 221, the third near-field antenna 231, the fourth near-field antenna 241, the first far-field antenna 212, the second far-field antenna 222, the third far-field antenna 232, and the fourth far-field antenna 242. Each PIN diode has a DC block to distinguish radio frequency signals among the first near-field antenna 211, the second near-field antenna 221, the third near-field antenna 231, the fourth near-field antenna 241, the first far-field antenna 212, the second far-field antenna 222, the third far-field antenna 232, and the fourth far-field antenna 242. Thus, the first near-field antenna 211, the second near-field antenna 221, the third near-field antenna 231, the fourth near-field antenna 241, the first far-field antenna 212, the second far-field antenna 222, the third far-field antenna 232, and the fourth far-field antenna 242 can separately operate. The DC block may be disposed on a substrate having a capacitor, and a DC blocking circuit having a capacitive effect can be regarded as an open-circuit for the DC signal, and the DC blocking circuit having a capacitive effect is regarded as an impedance for the high-frequency signal. Therefore, the first switch 213, the second switch 223, the third switch 233, and the fourth switch 243 can be appropriately used to enable or disable the first near-field antenna 211, the second near-field antenna 221, the third near-field antenna 231, the fourth near-field antenna 241, the first far-field antenna 212, the second far-field antenna 222, the third far-field antenna 232, and the fourth far-field antenna 242.

As shown in FIGS. 1 to 2, in a rugged portable device 100 according to an embodiment of the present invention, the base 11 further has an edge surface 113 between the upper surface 111 and the lower surface 112. The edge surface 113 is generally referred to any side surface 113 between the upper surface 111 and the lower surface 112. The cover 12 further includes an edge surface 123 between the upper cover surface 121 and the lower cover surface 122. The edge surface 123 is generally referred to any side surface 123 between the lower cover surface 122 and the upper cover surface 121.

As shown in FIGS. 1 to 3A, the first antenna unit 21 and the third antenna unit 23 may be directly disposed on a printed circuit board (PCB). However, in the preferred embodiment of the present invention, the first antenna unit 21 and the third communication unit 23 are electrically and signally integrated in a first flexible printed circuit (FPC) F1 and electrically connected to the control unit 40 via a coaxial cable (not shown). The first flexible printed circuit F1 can be easily folded to adapt to the internal wiring design of various rugged portable devices. The first flexible printed circuit F1 extends across the lower cover surface 122, the edge surface 123 and the upper cover surface 121 of the cover 12, and is generally in the form of U-shape, which has a first section F11, a second section F12 and a third section F13 connected between the first section Flt and the second section F12. The first section F11 corresponds to a periphery of the upper cover surface 121 of the cover 12; the second section F12 corresponds to a periphery of the lower cover surface 122 of the cover 12; and the third segment F13 corresponds to the edge surface 123 of the cover 12.

As described above, the second antenna unit 22 and the fourth antenna unit 24 are electrically and signally integrated in a second flexible printed circuit (FPC) F2 and electrically connected to the control unit 40 via a coaxial cable (not shown). The second flexible printed circuit F2 extends across the upper surface 111, the edge surface 113 and the lower surface 112 of the base 11, and has a fourth section F24, a fifth section F25 and a sixth section F26 connected between the fourth section F24 and the fifth section F25. The fourth section F24 corresponds to a periphery of the upper surface 111 of the base 11; the fifth section F25 corresponds to a periphery of the lower surface 112 of the base 11; and the sixth section F26 corresponds to the edge surface 113 of the base 11.

It is particularly noted that, in FIG. 1, the third section F13 of the first flexible printed circuit F1 corresponds to the edge surface 123 of the cover 12, and the sixth section F26 of the second flexible printed circuit F2 corresponds to the edge surface 113 of the base 11. However, in other embodiments, the locations of the first flexible printed circuit F1 and the second flexible printed circuit F2 may be changed. For example, the first flexible printed circuit F1 is located at the edge surface 123 of the cover 12, and the second flexible printed circuit F2 is located at the edge surface 113 of the base 11. The locations of the first flexible printed circuit F1 and the second flexible printed circuit F2 should not be limited as long as the purpose of the invention can be achieved. Furthermore, one side surface of the cover 12 may be generally referred to one of the upper cover surface 121, the lower cover surface 122, and the edge surface 123, and one side surface of the base 11 may be generally referred to one of the upper surface 111, the lower surface 112, and the edge surface 113.

Figure 3B:
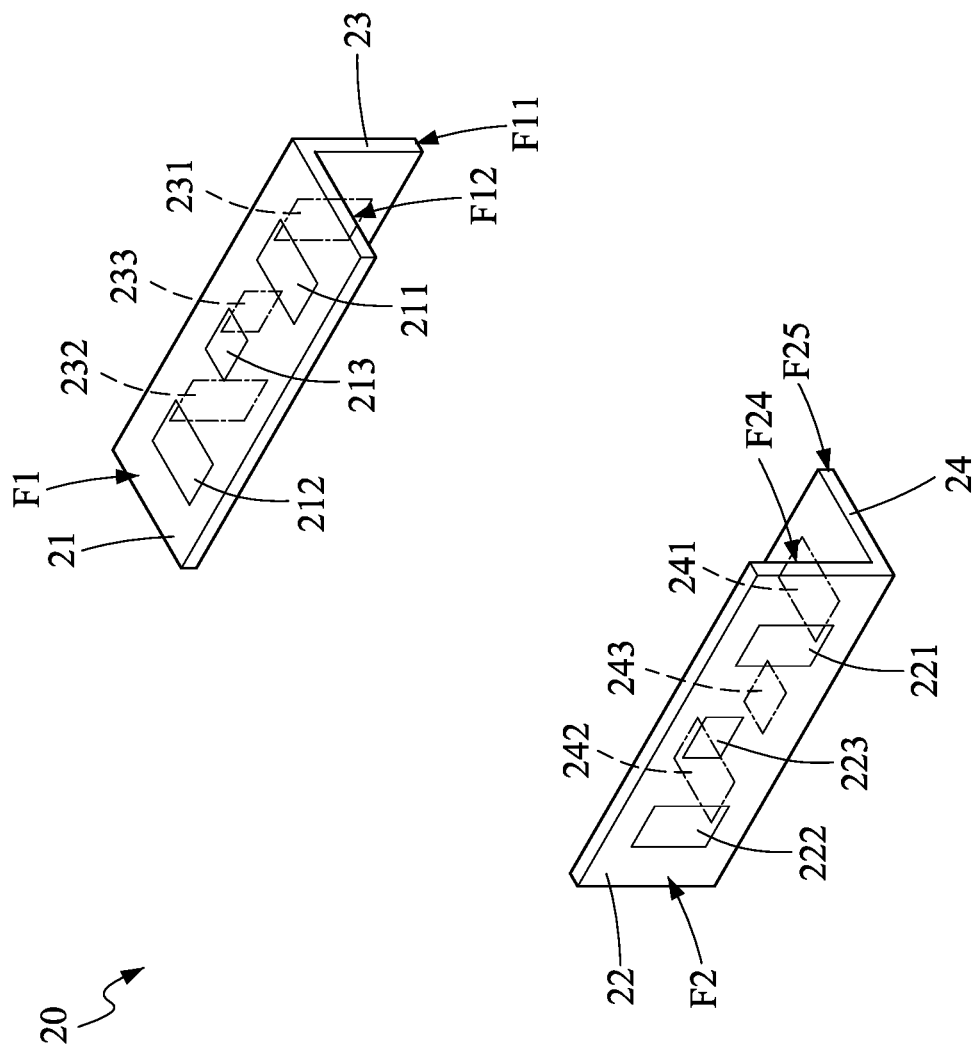
FIG. 3B is a schematic perspective view illustrating an antenna unit of a rugged portable device according to another embodiment of the present invention.

As shown in FIG. 3B, the first antenna unit 21, the second antenna unit 22, the third antenna unit 23, and the fourth antenna unit 24 of the rugged portable device 100 according to another embodiment of the present invention are shown schematically. The first antenna unit 21 and the third antenna unit 23 can be electrically and signally integrated in a first flexible printed circuit F1 with an L-shape and electrically and signally connected to the control unit 40 (see also FIG. 1). The second antenna unit 22 and the fourth antenna unit 24 can be electrically and signally integrated in a second flexible printed circuit F2 with an L-shape and electrically and signally connected to the control unit 40. The shape of the first flexible printed circuit F1 and the second flexible printed circuit F2 are not limited to this, and the first flexible printed circuit F1 and the second flexible printed circuit F2 can be used together with a printed circuit board. For example, the first antenna unit 21 and the third antenna unit 23 can be directly disposed on the printed circuit board, and can be coupled to each other by using the first flexible printed circuit F1.

As shown in FIGS. 1 to 2, the protecting element 30 includes a first protecting element 31 and a second protecting element 32. The protecting element 30 may be made of rubber or plastic. The first protecting element 31 covers a part of the cover 12 so that the first antenna unit 21 and the third antenna unit 23 are provided between the cover 12 and the first protecting element 31. The second protecting element 32 covers a part of the base 11 so that the second antenna unit 22 and the fourth antenna unit 24 are provided between the base 11 and the second protecting element 32. Since the protecting element 30 is made of rubber or plastic, the antenna signals of the first antenna unit 21, the second antenna unit 22, the third antenna unit 23, and the fourth antenna unit 24 can be well transmitted and received.

The control unit 40 may be a central processing unit (CPU), a microprocessor, or an application-specific integrated circuit (ASIC). When the cover 12 gets close to the base 11, a near-field communication sensing signal is generated by the first near-field antenna 211 of the first antenna unit 21 and the second near-field antenna 221 of the second antenna unit 22, and is transmitted to the control unit 40. Accordingly, the control unit 40 sets a function of the rugged portable device 100.

In another embodiment, the first near-field antenna 211 of the first antenna unit 21 is selectively coupled to one of the second near-field antenna 221 of the second antenna unit 22 or the fourth near-field antenna 241 of the fourth antenna unit 24 so as to generate a first near-field communication sensing signal; accordingly, the third near-field antenna 231 of the third antenna unit 23 is coupled to the other one of the second near-field antenna 221 of the second antenna unit 22 or the fourth near-field antenna 241 of the fourth antenna unit 24 so as to generate a second near-field communication sensing signal. The first or second near-field communication sensing signal is transmitted to the control unit 40. Accordingly, the control unit 40 changes and sets a function of the rugged portable device 100 according to the different near-field communication sensing signals. The control unit 40 sets the functions of the rugged portable device 100, including but not limited to enable or disable the first far-field antenna 212 of the first antenna unit 21, the second far-field antenna 222 of the second antenna unit 22, the third far-field antenna 232 of the third antenna unit 23, and the fourth far-field antenna 242 of the fourth antenna unit 24. Otherwise, the control unit 40 enables or disables the peripheral unit 13 of the rugged portable device 100.

For example, depending on the angle to which the cover 12 is pivoted with respect to the base 11, the rugged portable device 100 has usage modes including a folded mode, a working mode, a demonstrating mode (stand-up), and a flat mode. Also referring to FIGS. 1, 3A, 4A, and 5, when the cover 12 is pivoted in a first direction D1 toward the base 11 (e.g., the cover 12 is pivoted to 0 to 20 degrees with respect to the base 12), i.e., the lower cover surface 122 of the cover 12 faces and is close to the upper surface 111 of the base 11, which means that a user may not use the rugged portable device 100 soon, the rugged portable device 100 is in the folded mode. At this time, the first antenna unit 21 and the second antenna unit 22 generate a first near-field communication sensing signal, and the first near-field communication sensing signal is transmitted to the control unit 40. Accordingly, the control unit 40 sets a first function of the rugged portable device 100. For example, the control unit 40 controls the first switch 213, the second switch 223, the third switch 233, the fourth switch 243 to actively disable the first far-field antenna 212 of the first antenna unit 21, the second far-field antenna 222 of the second antenna unit 22, the third far-field antenna 232 of the third antenna unit 23, the fourth far-field antenna 242 of the fourth antenna unit 24, and to actively disable the peripheral unit 13 to save the power consumption. In other embodiments, however, the first near-field communication sensing signal may be generated by inductive coupling between the first antenna unit 21 and the fourth antenna unit 24. Otherwise, the first near-field communication sensing signal may be generated by inductive coupling between the third antenna unit 23 and the fourth antenna unit 24 to disable the first far-field antenna 212, the second far-field antenna 222, the third far-field antenna 232, the fourth far-field antenna 242 to save the power consumption.

Also referring to FIGS. 1, 3A, 4A, 4B, 4C, 4D, and 5, when the cover 12 is pivoted with respect to the base 11 in a second direction D2 opposite to the first direction, the rugged portable device 100 is in an unfolded mode including but not limited to: a working mode, a demonstrating mode, and a flat mode. When the cover 12 is pivoted to 330 to 360 degrees with respect to the base 11 in a second direction D2 opposite to the first direction, i.e., the upper cover surface 121 of the cover 12 faces and is close to the lower surface 112 of the base 11, representing a user may want to use the display screen 124 only as a display or to stand up the rugged portable device on a tabletop to view a video, the rugged portable device 100 is in the demonstrating mode (stand-up). Therefore, the keyboard 131 and the touchpad 134 may not be used. The third near-field antenna 231 of the third antenna unit 23 and the fourth near-field antenna 241 of the fourth antenna unit 24 generate a second near-field communication sensing signal, and the second near-field communication sensing signal is transmitted to the control unit 40. Accordingly, the control unit 40 sets a second function of the rugged portable device 100. For example, the control unit 40 disables the operation input units (the keyboard 131 and the touchpad 134) of the peripheral unit 13 and the rear camera 133. Otherwise, the control unit 40 may also disable the third far-field antenna 232 of the third antenna unit 23 and the fourth far-field antenna 242 of the fourth antenna unit 24 by the third switches 233 and the fourth switch 243 to save the power consumption. Furthermore, since the upper cover surface 121 and the lower surface 112 of the rugged portable device 100 are usually made of metal, the antenna signals of the third antenna unit 23 and the fourth antenna unit 24 may be shielded and the signals are poor when the cover 12 is pivoted to 330 to 360 degrees with respect to the base 11; so it is not necessary to use the third far-field antenna 232 and the fourth far-field antenna 242, and the third far-field antenna 232 and the fourth far-field antenna 242 are disabled.

Also referring to FIGS. 1, 3A, 4B, 4C and 5, the rugged portable device 100 is in the working mode when the cover 12 is pivoted to 100 to 120 degrees with respect to the base 11 in a second direction D2 opposite to the first direction; and the rugged portable device 100 is in the flat mode when the cover 12 is pivoted to 180 degrees with respect to the base 11 in a second direction D2 opposite to the first direction. When the first near-field communication sensing signal and the second near-field communication sensing signal are not generated (that is, the distance between the base 11 and the cover 12 is too far to be inductively coupled between the first near-field antenna 211 and the second near-field antenna 221, or between the third near-field antenna 231 and the fourth near-field antenna 241), the rugged portable device 100 is normally used by the user according to a default value of the rugged portable device 100, and the rugged portable device 100 is in the working mode or flat mode.

Figure 4B:
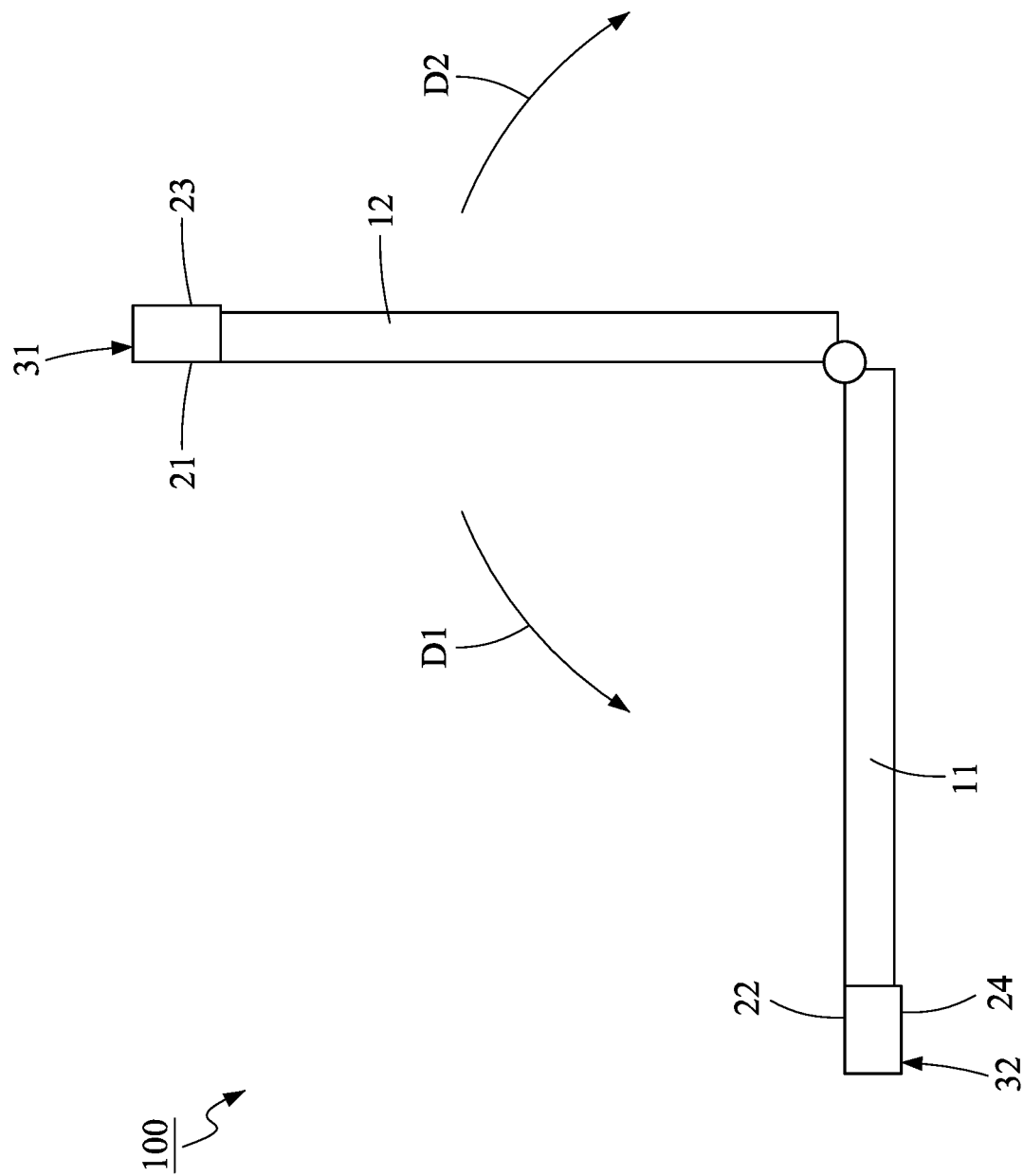
FIG. 4B is a schematic side view illustrating a working mode of a rugged portable device according to an embodiment of the present invention.
Figure 4C:
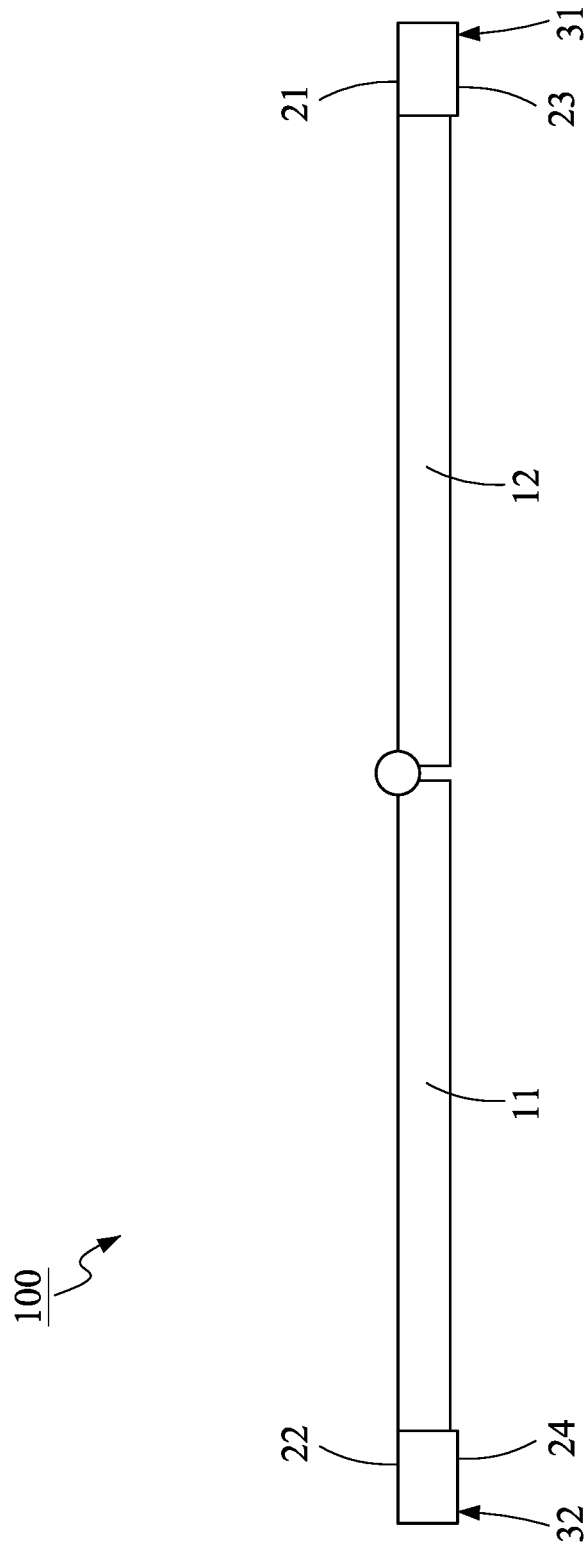
FIG. 4C is a schematic side view illustrating a flat mode of a rugged portable device according to an embodiment of the present invention.
Figure 4D:
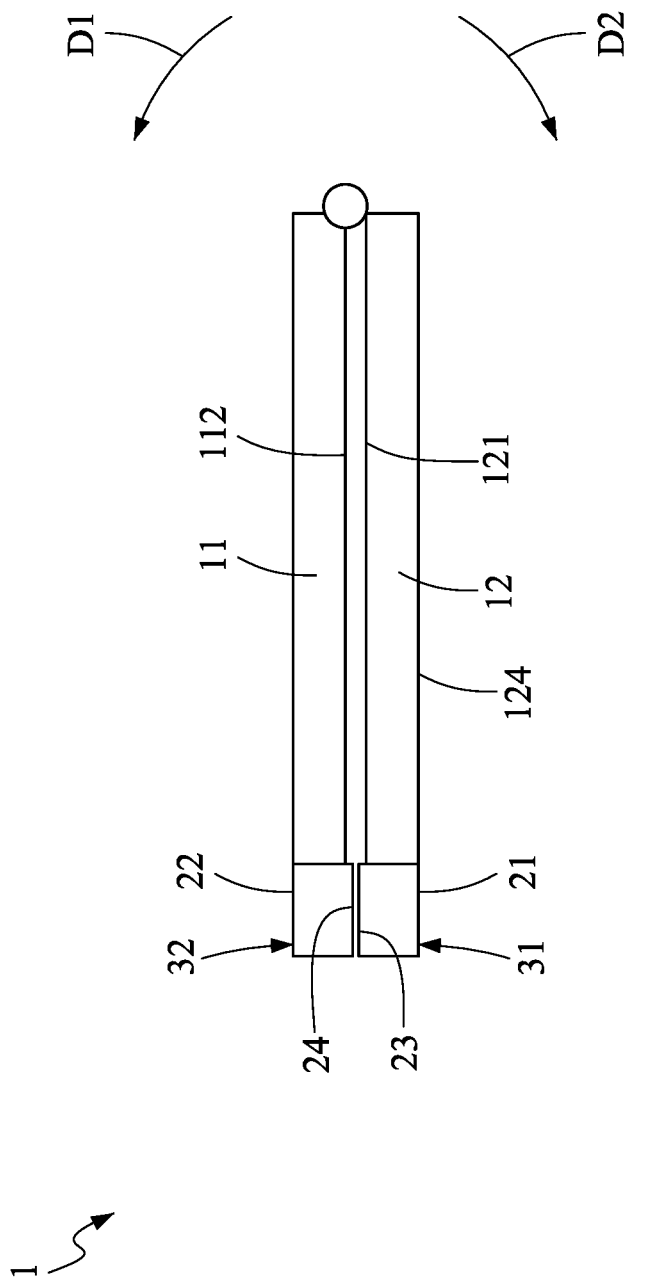
FIG. 4D is a schematic side view illustrating a demonstrating mode of a rugged portable device according to an embodiment of the present invention.
Figure 4E:
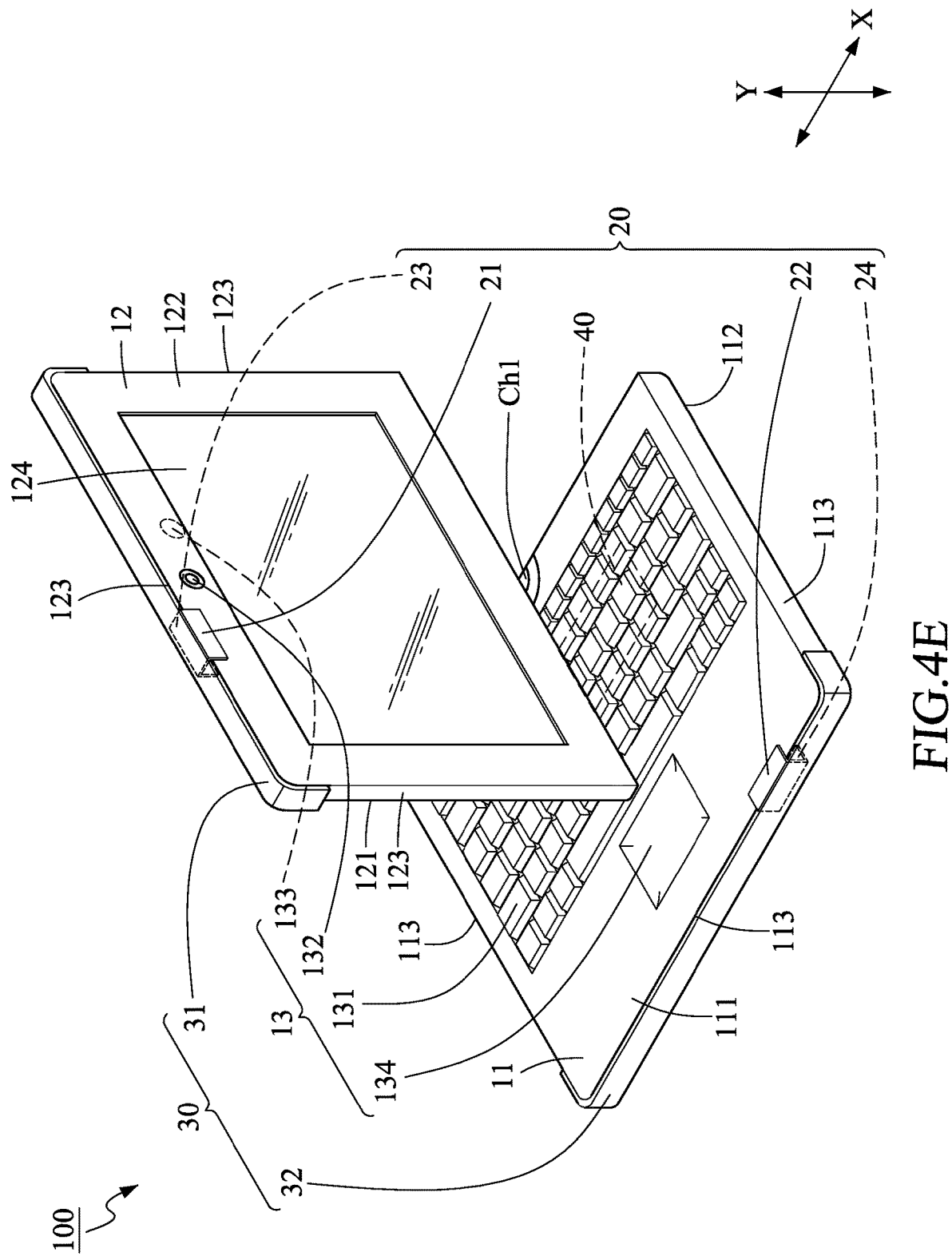
FIG. 4E is a schematic drawing illustrating a demonstrating mode of a rugged portable device according to an embodiment of the present invention.
Figure 4F:
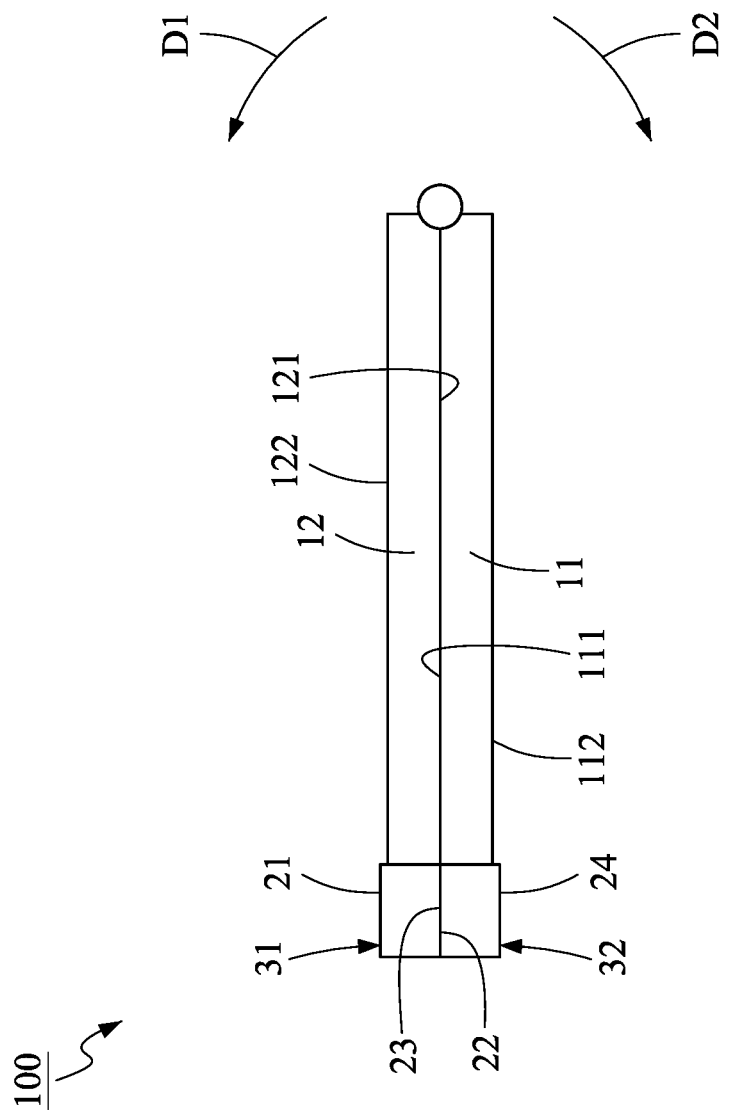
FIG. 4F is a schematic side view illustrating a demonstrating mode of a rugged portable device according to an embodiment of the present invention.

In particular, in the above embodiment, with reference to FIG. 1, a side hinge Sh1 is used in the rugged portable device 100. The side hinge Sh1 is typically arranged on both sides of the rugged portable device 100. The side hinge Sh1 usually comprises two (or more) pivots, each of which is parallel to the X-axis. Usually, one pivot of the side hinge Sh1 is disposed at the cover 12 and the other pivot is disposed at the base 11, so that the pivot of the cover 12 can be pivoted around the pivot of the base 11; thus, the cover 12 can be pivoted with respect to the base 11 from 0 to 360 degrees to convert into the working mode, the demonstrating mode or the flat mode. However, there are various hinges available on the market at present, and these hinges can be applied to the rugged portable device 100. For example, a center hinge is another type of hinge that can be applied to the rugged portable device 100. With reference to FIGS. 1, 4E and 4F, a center hinge Ch1 is disposed at a middle position between the base 11 and the cover 12. Therefore, the cover 12 can be pivoted to 180 degrees with respect to the base 11 about the Y-axis of the center hinge Ch1, so that the upper cover surface 121 of the cover 12 faces and is close to the upper surface 111 of the base 11, and then is laid on the base 11 such that the display screen 124 can also be revealed to convert into the demonstrating mode. Preferably, the cover 12 is positioned at about 0 to 30 degrees with respect to the base 11. In another variation embodiment of the hinge, the hinge may be a detachable hinge (not shown). When the detachable hinge is applied to the rugged portable device 100, the cover 12 is detachably coupled to the base 11. Specifically, after the cover 12 has been removed from the base 11, the cover 12 is rotated 180 degrees (or the cover is flipped over), then the cover 12 is inserted into the base 11, and then the cover 12 is pivoted about the X-axis to cover the base 11, so that the upper cover surface 121 of the cover 12 faces and is close to the upper surface 111 of the base 11, such that the display screen 124 can be revealed to convert into the demonstrating mode. Therefore, the present invention is not limited to the use of a specific hinge, nor is not limited to the pivotable angle of the hinge. Therefore, it can be considered as the main idea of the present invention that any one of the first antenna unit 21 and the third antenna unit 23 disposed on the cover 12, and any one of the second antenna unit 22 and the fourth antenna unit 24 disposed on the base 11 can generate the near-field communication sensing signals when the cover 12 and the base 11 get close to each other.

As can be seen from the above, the rugged portable device 100 of the present invention has the following advantages. (1) The first antenna unit 21, the second antenna unit 22, the third antenna unit 23 and the fourth antenna unit 24 of the antenna unit 20 are provided between the cover 12/the base 11 and the protecting element 30, so that in any usage mode, at least some of the first far-field antenna 212, the second far-field antenna 222, the third far-field antenna 232, and the fourth far-field antenna 242 of the rugged portable device 100 always face outward and the signals of the first far-field antenna 212, the second far-field antenna 222, the third far-field antenna 232, and the fourth far-field antenna 242 are not shielded by the metal housing. (2) By inductive coupling between the first near-field antenna 211, the second near-field antenna 221, the third near-field antenna 231, and the fourth near-field antenna 241, the control unit 40 determines which one of the usage modes the user is about to enter, and accordingly the control unit 40 pre-sets a function of the rugged portable device 100, including, for example, but not limited to, enabling or disabling the first near-field antenna 211, the second near-field antenna 221, the third near-field antenna 231, the fourth near-field antenna 241 or the first far-field antenna 212, the second far-field antenna 222, the third far-field antenna 232, the fourth far-field antenna 242, and enabling or disabling the peripheral unit 13 to save the power consumption. (3) The present invention uses the first flexible printed circuit F1 and the second flexible printed circuit F2 to integrate the first near-field antenna 211, the second near-field antenna 221, the third near-field antenna 231, the fourth near-field antenna 241, the first far-field antennas 212, the second far-field antenna 222, the third far-field antenna 232, the fourth far-field antenna 242, and the first switch 213, the second switch 223, the third switch 233, and the fourth switch 243 of the antenna unit 20, and makes full use of the area between the cover 12/the base 11 and the protecting element 30 to dispose the antenna unit 20. Thus, the rugged portable device 100 can effectively use an internal space thereof.

The above description should be considered as only the discussion of the preferred embodiments of the present invention. However, a person having ordinary skill in the art may make various modifications without deviating from the present invention. Those modifications still fall within the scope of the present invention.

What is claimed is:

1. A rugged portable device, comprising:
   a base;
   a cover pivotally connected to the base;
   a first antenna unit disposed at the cover and having a first near-field antenna;
   a second antenna unit disposed at the base and having a second near-field antenna;
   a first protecting element disposed on at least one side surface of the cover such that first antenna unit is located between the cover and the first protecting element;
   a second protecting element disposed on at least one side surface of the base such that the second antenna unit is located between the base and the second protecting element; and
   a control unit coupled to the first antenna unit and the second antenna unit,
   wherein when the cover is pivoted with respect to the base and gets close to the base, the first near-field antenna of the first antenna unit and the second near-field antenna of the second antenna unit generate a near-field communication sensing signal, the near-field communication sensing signal is transmitted to the control unit, and thereby enabling the control unit to perform a functional operation of the rugged portable device
   wherein the first near-field antenna of the first antenna unit is coupled to a first far-field antenna and a first switch, the second near-field antenna of the second antenna unit is coupled to a second far-field antenna and a second switch, and the functional operation of the rugged portable device performed by the control unit includes:
   using the first switch of the first antenna unit to disable or enable the first far-field antenna of the first antenna unit; and
   using the second switch of the second antenna unit to disable or enable the second far-field antenna of the second antenna unit.

2. The rugged portable device as claimed in claim 1, wherein the functional operation of the rugged portable device performed by the control unit includes enabling or disabling a peripheral unit.

3. The rugged portable device as claimed in claim 1, wherein the first near-field antenna, the first far-field antenna and the first switch of the first antenna unit are electrically and signally integrated on a first flexible printed circuit, and the second near-field antenna, the second far-field antenna and the second switch of the second antenna unit are electrically and signally integrated on a second flexible printed circuit.

4. The rugged portable device as claimed in claim 3, wherein the first switch of the first antenna unit and/or the second switch of the second antenna unit are/is a PIN diode, the PIN diode includes a DC block which is disposed on a substrate having a capacitance to distinguish between a radio frequency, signal transmitted by the first near-field antenna and the second near-field antenna and a radio frequency signal transmitted by the first far-field antenna and the second far-field antenna.

5. A rugged portable device, comprising:
   a base;
   a cover pivotally connected to the base, the cover being capable of being pivoted with respect to the base in a first direction to define a folded mode, and the cover being capable of being pivoted with respect to the base in a second direction; opposite to the first direction; to define a demonstrating mode;
   a first antenna unit disposed on one side surface of the cover and having a first near-field antenna, a first far-field antenna and a first switch;
   a second antenna unit disposed on one side surface of the base and having a second near-field antenna, a second far-field antenna and a second switch;
   a third antenna unit disposed on another side surface of the cover and having a third near-field antenna, a third far-field antenna and a third switch;
   a fourth antenna unit disposed on another side surface of the base and having a fourth near-field antenna, a fourth far-field antenna and a fourth switch;
   a first protecting element disposed on at least one of the side surfaces of the cover and covering the first antenna unit and the third antenna unit such that the first antenna unit and the third antenna unit are located between the cover and the first protecting element;
   a second protecting element disposed on at least one of the side surfaces of the base and covering the second antenna unit and the fourth antenna unit such that the second antenna unit and the fourth antenna unit are located between the base and the second protecting element; and
   a control unit coupled to the first antenna unit, the second antenna unit, the third antenna and the fourth antenna unit;
   wherein when the rugged portable device is in the folded mode, the first near-field antenna of the first antenna unit and the second near-field antenna of the second antenna unit generate a first near-field communication sensing signal, the first near-field communication sensing signal is transmitted to the control unit, the control unit accordingly uses the first switch of the first antenna unit and the second switch of the second antenna unit to disable or enable the first far-field antenna of the first antenna unit and the second far-field antenna of the second antenna unit; and wherein when the rugged portable device is in the demonstrating mode, the third near-field antenna of the third antenna unit and the fourth near-field antenna of the fourth antenna unit generate a second near-field communication sensing signal, the second near-field communication sensing signal is transmitted to the control unit, the control unit accordingly uses the third switch of the third antenna unit and the fourth switch of the fourth antenna unit to disable or enable the third far-field antenna of the third antenna unit and the fourth far-field antenna of the fourth antenna unit.

6. The rugged portable device as claimed in claim 5, wherein the side surfaces of the cover includes an upper cover surface and a lower cover surface, the first antenna unit is disposed on the lower cover surface, the third antenna unit is disposed on the upper cover surface, the side surfaces of the base includes an upper surface and a lower surface, the second antenna unit is disposed on the upper surface, the fourth antenna unit is disposed on the lower surface, the first antenna unit and the third antenna unit are electrically and signally connected to each other via a first flexible printed circuit, and the second antenna unit and the fourth antenna unit are electrically and signally connected to each other via a second flexible printed circuit.

7. The rugged portable device as claimed in claim 5, wherein the side surfaces of the cover includes an upper cover surface and an edge surface, the first antenna unit is disposed on the edge surface of the cover, the third antenna unit is disposed on the upper covering surface, the side surfaces of the base includes a lower surface and an edge surface, the second antenna unit is disposed on the edge surface of the base, the fourth antenna unit is disposed on the lower surface, the first antenna unit and the third antenna unit are electrically and signally connected to each other via a first flexible printed circuit, and the second antenna unit and the fourth antenna unit are electrically and signally connected to each other via a second flexible printed circuit.

8. The rugged portable device as claimed in claim 5, wherein the first near-field antenna, the first far-field antenna and the first switch of the first antenna unit are electrically and signally integrated on a first flexible printed circuit, and the second near-field antenna, the second far-field antenna and the second switch of the second antenna unit are electrically and signally integrated on a second flexible printed circuit.

9. The rugged portable device as claimed in claim 8, wherein the first switch of the first antenna unit and/or the second switch of the second antenna unit are/is a PIN diode, the PIN diode includes a DC block which is disposed on a substrate having a capacitance to distinguish between a radio frequency signal transmitted by the first near-field antenna and the second near-field antenna and a radio frequency signal transmitted by the first far-field antenna and the second far-field antenna.

10. A rugged portable device, comprising:
a base;
a cover pivotally connected to the base to become a folded mode or a demonstrating mode;
a first antenna unit disposed on one side surface of the cover and having a first near-field antenna;
a second antenna unit disposed on one side surface of the base and having a second near-field antenna;
a third antenna unit disposed on another side surface of the cover and having a third near-field antenna;
a fourth antenna unit disposed on another side surface of the base and having a fourth near-field antenna;
a first protecting element disposed on at least one of the side surfaces of the cover and covering the first antenna unit and the third antenna unit such that the first antenna unit and the third antenna unit are located between the cover and the first protecting element;
a second protecting element disposed on at least one of the side surfaces of the base and covering the second antenna unit and the fourth antenna unit such that the second antenna unit and the fourth antenna unit are located between the base and the second protecting element; and
a control unit coupled to the first antenna unit, the second antenna unit, the third antenna and the fourth antenna unit;
wherein, when the rugged portable device is in the folded mode, the first near-field antenna of the first antenna unit is selectively coupled to one of the second near-field antenna of the second antenna unit or the fourth near-field antenna of the fourth antenna unit to generate a first near-field communication sensing signal, the first near-field communication sensing signal being transmitted to the control unit, and accordingly the control unit performing a first functional operation to a first function of the rugged portable device; and
wherein when the rugged portable device is in the demonstrating mode, the third near-field antenna, of the third antenna unit is coupled to the other one of the second near-field antenna of the second antenna unit or the fourth near-field antenna of the fourth antenna unit to generate a second near-field communication sensing signal, the second near-field communication sensing signal being transmitted to the control unit, and accordingly the control unit performing a second functional operation to a second function of the rugged portable device.

11. The rugged portable device as claimed in claim 10, wherein the first near-field antenna of the first antenna unit is coupled to a first, far-field antenna and a first switch, the second near-field antenna of the second antenna unit is coupled to a second far-field antenna and a second switch, the first functional operation to the first function of the rugged portable device performed by the control unit includes:
using the first switch of the first antenna unit to disable or enable the first far-field antenna of the first antenna unit; and
using the second switch of the second antenna unit to disable or enable the second far-field antenna of the second antenna unit.

12. The rugged portable device as claimed in claim 10, wherein the first antenna unit is coupled to the third antenna unit via a first flexible printed circuit (FPC), and the second antenna unit is coupled to the fourth antenna unit via a second flexible printed circuit.

* * * * *